J. A. FRAUENHEIM.
STAYBOLT AND METHOD OF MAKING SAME.
APPLICATION FILED MAY 31, 1918.

1,372,875.

Patented Mar. 29, 1921.

WITNESSES

INVENTOR

J. A. FRAUENHEIM.
STAYBOLT AND METHOD OF MAKING SAME.
APPLICATION FILED MAY 31, 1918.
1,372,875.
Patented Mar. 29, 1921.
2 SHEETS—SHEET 2.
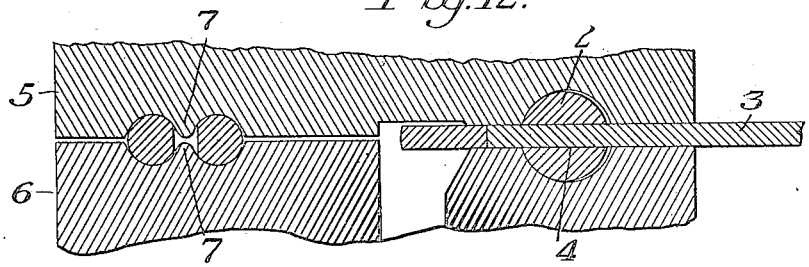
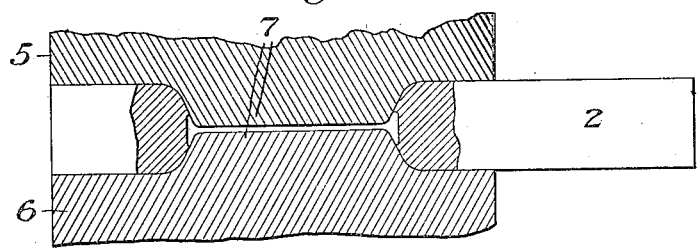
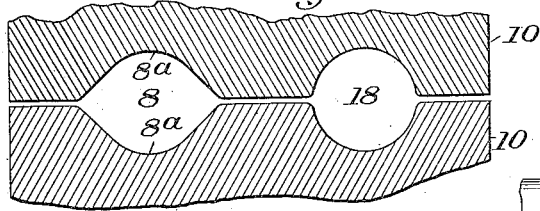
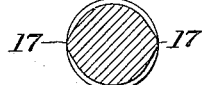
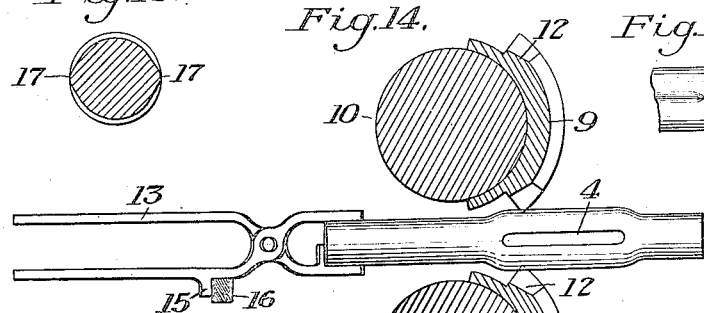
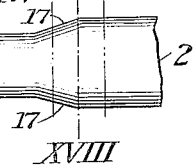
WITNESSES
INVENTOR

UNITED STATES PATENT OFFICE.

JOSEPH A. FRAUENHEIM, OF ZELIENOPLE, PENNSYLVANIA, ASSIGNOR TO AMERICAN FLEXIBLE BOLT COMPANY, OF PITTSBURGH, PENNSYLVANIA, A CORPORATION OF PENNSYLVANIA.

STAYBOLT AND METHOD OF MAKING SAME.

1,372,875.  Specification of Letters Patent.  Patented Mar. 29, 1921.

Application filed May 31, 1918. Serial No. 237,406.

*To all whom it may concern:*

Be it known that I, JOSEPH A. FRAUENHEIM, a resident of Zelienople, in the county of Butler and State of Pennsylvania, have invented a new and useful Improvement in Staybolts and Methods of Making the Same, of which the following is a full, clear, and exact description, reference being had to the accompanying drawings, forming part of this specification, in which—

Fig. 12 is a sectional view illustrating the shearing and anviling operations;

Fig. 13 is another sectional view taken at right angles to the plane of Fig. 12, showing the anviling operation;

Fig. 14 is a transverse section through one of the roll passes;

Fig. 15 is a longitudinal section showing the two roll passes;

Figs. 16 and 17 are plan views taken at 90° to each other, showing one end portion of the blank after it has been subjected to the action of the first roll pass; and Fig. 18 is a section on the line XVIII—XVIII of Fig. 17.

My invention has relation to stay bolts and the manufacture thereof, and more particularly to stay bolts of that type in which the body and heads are formed from a single integral piece of metal, the body portion of the blank having a part of its metal removable diametrically therefrom, the said body portion being then closed in and twisted about the longitudinal axis of the blank.

The present invention is an improvement upon the method of manufacture described and claimed in my Patent No. 1,271,150, dated July 2, 1918.

This invention is designed to provide a stay bolt of the general character above described, which will be free from any sharp angles or edges at which fractures may originate. Also to provide a bolt of this character in which the body-forming portion of the blank is roll-shaped and finished, thereby avoiding the use of dies for this purpose.

My invention also provides a simple and practicable method by which stay bolts of this type may be readily manufactured on a commercial scale.

Figure 1:
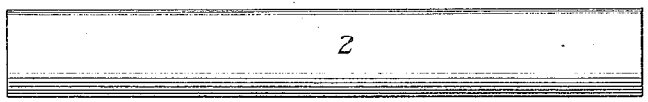
Figure 1 is a plan view and Fig. 2 a cross section of the initial form of blank which I employ in carrying out my invention.
Figure 2:
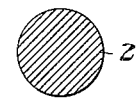
Figure 3:
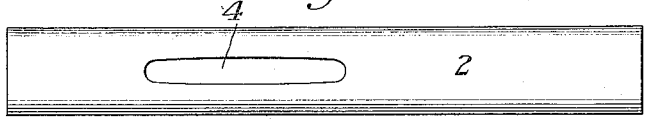
Figs. 3 and 4 are similar views showing the blank after the punching or shearing operation.
Figure 4:
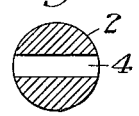
Figure 6:
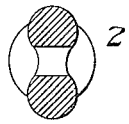

In carrying out my invention, I provide a cylindrical blank 2, such as illustrated in Figs. 1 and 2, of substantially the same cross section throughout its length. I then remove a part of the metal from the intermediate portion of this blank by a suitable punch or shear, such as indicated at 3 in Fig. 12, thereby forming in the blank a longitudinally extending diametrical slot 4, which is somewhat shorter than the body of the final bolt. I next subject the blank to an anviling operation between dies 5 and 6, such as shown in Figs. 12 and 13, these dies having the coöperating flanges 7, which are designed to enter the slot 4, slightly widening such slot, and simultaneously shaping this portion of the blank to approximately the cross section shown in Fig. 6. It will be noted from this figure that the portions of the blank lying at opposite sides of the slot 4 are not only spread laterally beyond the general lines of the blank, but that they are also shaped to partially circular form, thereby doing away with the sharp edges which would otherwise exist in the slot walls. These sharp edges have been found in practice to be objectionable, in that they form a starting point for fractures. This is entirely overcome by shaping and rounding these edges in the manner just described.

The blank is next subjected to the action of a roll pass 8, of the general form shown in Fig. 15. This pass is generally elliptical in cross section, but has the portions 8ᵃ approximately cylindrical. This pass is formed between segmental projections 9 of a pair of rolls 10, the passes having contacting walls of just sufficient length to act upon the slotted portion of the blank and also upon short portions thereof at each end of the slot and which are to form the tapered or frusto-conical portions 11, which unite the body portion of the bolt with its end portions. The entrance and exit to this roll pass are beveled, as indicated at 12 in Fig. 14, to form these tapered or frusto-conical portions. In order that the pass may act upon exactly the right portion of the blank, the latter may be grasped by a pair of tongs or pincers, such as shown at 13 in Fig. 14, and inserted between the rolls until a projection 15 on the tongs engages a fixed stop 16.

After the blank has been subjected to the action of this roll pass, it has substantially the form shown in Figs. 16, 17 and 18; that is, the portions of the metal at each side of the slot 4 have been closed in against each other, thereby forming the reduced body portion of the blank. Such pressed in portions have been partially shaped to cylindrical form, although being slightly elliptical on one axis; and the tapered or frusto-conical portions 11 have also been formed. On each of these portions on diametrically opposite sides, the blank has the projecting fins or ribs 17 of metal, as best shown in Figs. 17 and 18. These fins or ribs 17 are essential to the proper action of the succeeding roll pass 18 (which may also be formed in the projections 9 of the rolls 10) in that they make certain that the rolls will commence to grip and bite the blank at exactly the right points as determined by the stop 15. To further insure this, the tongs 13 may be constructed as shown in Fig. 14, to grip each blank at the same distance from the end. Without the presence of these ribs or fins, the rolls might initially slip somewhat upon the blank, and the portions 11 would not be symmetrically shaped.

Figure 7:
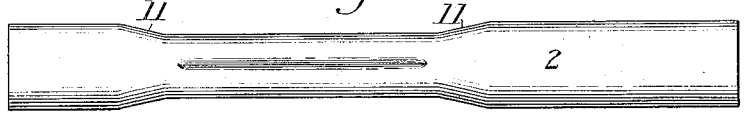
Fig. 7 is a plan view showing the blank after it has been closed in and roll-finished.
Figure 8:
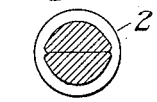
Fig. 8 is a sectional view of Fig. 7.
Figure 9:
Fig. 9 is a plan view of the twisted blank.
Figure 10:
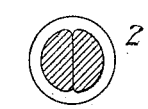
Fig. 10 is a sectional view of Fig. 9.
Figure 11:
Fig. 11 is a plan view of the completed bolt.

After being subjected to the action of the pass 18, the blank has the form substantially as shown in Figs. 7 and 8. This body-forming portion, containing the closed-in slot, is then twisted about the longitudinal axis of the bolt, as shown in Fig. 9, and the head-forming portions of the blank are properly shaped and threaded so as to form a finished bolt, such as that shown in Fig. 11.

Figure 5:
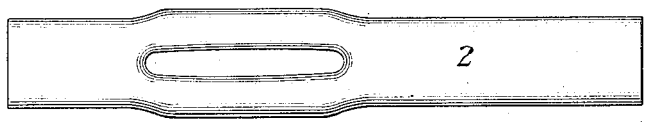
Figs. 5 and 6 are views similar, respectively, to Figs. 1 and 2, and showing the blank after the anviling operation.

It will be noted by a comparison of Figs. 5 and 7 that the slotted portion of the blank is somewhat elongated by the action of the first roll pass, and the proper cross sectional area of this portion can be determined with a given reduction in this pass by varying the amount of metal removed in forming the slot 4.

The tapered or frusto-conical portions 11 not only permit the roll-finishing operations described, but they are also desirable in the finished bolt, in that they prevent any sharp angles between the body and head portions of the bolt, in which fractures may originate.

The roll-finishing of the body portions of the bolts not only provides a superior bolt, but it enables the operations to be carried out much more rapidly and conveniently than is possible with the use of dies. By the use of roll passes, the bolts are free from fins or other projections such as are apt to be formed when dies are employed.

I claim:

1. A stay bolt having a reduced body portion and larger heads, said body and heads being formed from an integral piece of metal, said body portion being diametrically slotted and the side members formed by said slots being closed in against each other and then twisted about the longitudinal axis of the bolt, and the edges of the slot-forming walls being rounded, substantially as described.

2. The method of making stay bolts having twisted body portions, which consists in providing an approximately cylindrical blank of substantially the same cross section throughout its length, removing a portion of the metal from the blank intermediate of its ends, to thereby form a diametrically extending longitudinal slot therein, shaping the metal at the opposite sides of said slot to round in the edges of the slot walls, then closing in said walls against each other to thereby form a reduced body portion, and shaping said portion to cylindrical form and then twisting said body portion about the longitudinal axis of the bolt, substantially as described.

3. In the manufacture of stay bolts having twisted body portions and enlarged heads all formed from an integral piece of metal, the improvement which consists in providing an approximately cylindrical blank of substantially the same cross section throughout its length, forming a diametrically extending longitudinal slot therein, then shaping the metal at the sides of said slots into partially cylindrical form, and then subjecting a portion of the blank to the action of roll passes to reduce it to cylindrical form roll shape and roll finish it, substantially as described.

4. In the manufacture of stay bolts having reduced twisted body portions, the improvement which consists in providing an approximately cylindrical blank, forming a diametrically extending longitudinal slot therein, subjecting the metal at opposite sides of said slot to a shaping operation to thereby round in the edge-forming walls of the slot, then subjecting the body-forming portion of the blank to the action of a generally elliptical roll pass to close said slot and partially shape the body-forming portion and also to partially form tapered or frustro-conical connecting portions between the slotted body and the head-forming ends of the blank, then turning the blank 90°, and subjecting it to the action of a cylindrical roll pass, and then twisting the slotted portion of the blank about its longitudinal axis, substantially as described.

In testimony whereof, I have hereunto set my hand.

JOSEPH A. FRAUENHEIM.